United States Patent [19]

Kettler

[11] Patent Number: 5,823,564
[45] Date of Patent: Oct. 20, 1998

[54] COLLAPSIBLE BABY CARRIAGE AND STROLLER

[75] Inventor: Heinz Kettler, Ense, Germany

[73] Assignee: Herlag Holzwarenfabrik GmbH & Co., Lauenfoerde, Germany

[21] Appl. No.: 524,423

[22] Filed: Sep. 6, 1995

[30] Foreign Application Priority Data

Sep. 6, 1994 [DE] Germany ............ 44 31 636.4

[51] Int. Cl.⁶ ...................................... B62B 7/08
[52] U.S. Cl. ............................ 280/642; 280/658
[58] Field of Search ............... 280/641, 642, 280/647, 40, 657, 658

[56] References Cited

U.S. PATENT DOCUMENTS

| | | | |
|---|---|---|---|
| 2,037,986 | 4/1936 | Larsen | 280/647 |
| 2,037,987 | 7/1936 | Larsen | 280/647 |
| 2,037,988 | 4/1936 | Larsen | 280/647 |
| 5,364,119 | 11/1994 | Leu | 280/647 |

FOREIGN PATENT DOCUMENTS

| | | |
|---|---|---|
| 2 603 240 | 3/1988 | France . |
| 1 918 096 | 11/1970 | Germany . |
| 85 681 | 6/1972 | Germany . |
| 38 30 752 | 11/1991 | Germany . |
| 1 525 878 | 9/1978 | United Kingdom . |

*Primary Examiner*—Richard M. Camby
*Attorney, Agent, or Firm*—Herbert L. Lerner; Laurence A. Greenberg

[57] ABSTRACT

A collapsible baby stroller has a non-collapsible base frame with wheels. A seat, a handlebar, and a chest bar are supported on the base frame. A plurality of joints are provided for collapsing the baby stroller above the base frame. The base frame has an outer boundary as seen in a plan view, and the handlebar, the armrests, the seat, and the chest bar, when the stroller is folded, do not protrude substantially past the outer boundary of the base frame.

38 Claims, 9 Drawing Sheets

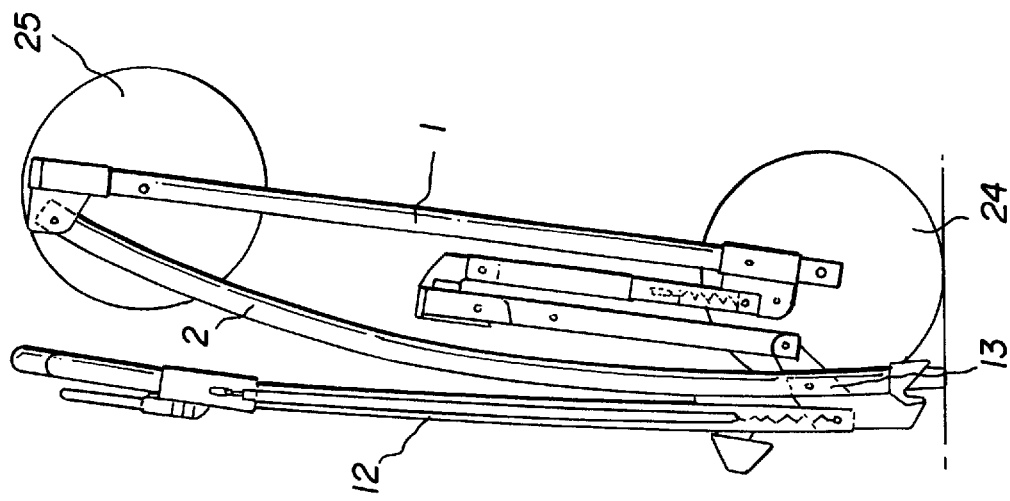
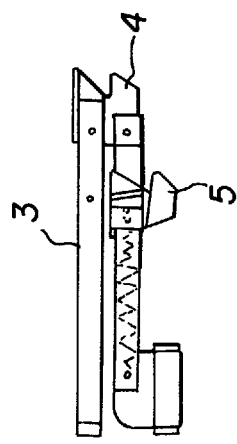
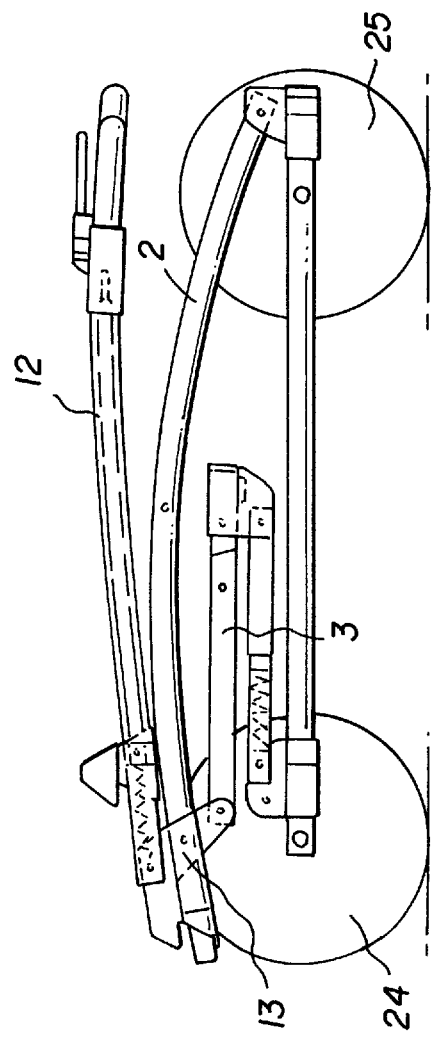

COLLAPSIBLE BABY CARRIAGE AND STROLLER

BACKGROUND OF THE INVENTION

1. Field of the Invention

The invention relates to baby strollers, i.e. to collapsible baby carriages and/or strollers with a handlebar and armrests, associated with a seat part, and a chest bar.

Collapsible baby carriages and/or strollers have stood the test of time. In each case, they are collapsed either in the axial direction, thus reducing the width of the carriage or stroller, but not its length to any major extent, or else the wheelbase is reduced by a hinged or telescoping mechanism, thus markedly reducing the length but not the height of the carriage or stroller.

There is a desire in prior art strollers and baby carriages to provide for a further reduction in the collapsed and folded size.

2. Summary of the Invention

It is accordingly an object of the invention to provide a collapsible baby carriage and/or stroller, which overcomes the above-mentioned disadvantages of the heretofore-known devices and methods of this general type and to provide collapsible baby carriage and/or stroller which requires even less space, and which can be put into the functional position and collapsed extraordinarily quickly.

With the foregoing and other objects in view there is provided, in accordance with the invention, a collapsible baby stroller, comprising a base frame, a handlebar connected to the base frame and armrests attached to the handlebar, a seat supported on the base frame, and a chest bar associated with the seat; and a plurality of joints for collapsing the baby stroller above the base frame.

In accordance with another feature of the invention, the base frame has an outer boundary as seen in a plan view, and the handlebar, the armrests, the seat, and the chest bar do not protrude substantially past the outer boundary of the base frame in a collapsed state of the baby stroller.

In accordance with an added feature of the invention, the baby stroller further comprises front bearing tubes and rear support tubes pivotally connected to the base frame. The rear support tubes may be embodied in divided form and include at least two support tube parts. There is also provided a folding hinge pivotally joining together the two support tube parts of the rear support tube. A mechanically actuatable safety lock may be associated with the folding hinge. There is further provided, in accordance with the invention, a shift lever having a first end pivotally connected at an upper region of the folding hinge. The shift lever has a second end opposite the first end, and the second end is either directly or indirectly pivotally connected to bearing elements of the seat.

In accordance with an additional feature of the invention, the baby stroller comprises a cross bar attached to and rigidly joining the support tubes above the folding hinge.

In accordance with a further feature of the invention, the bearing elements are in the form of a frame receiving the seat. There is also provided a locking bar associated with a rear region of the bearing element. The locking bar has outer ends, and including an upwardly-extending locking hook connected to each of the outer ends of the locking bar. The locking hooks are pivotally connected to the bearing elements for the seat. The locking hooks are preferably disposed on the cross bar. There is also provided one compression spring associated with each of the locking hooks.

In accordance with again another feature of the invention, the baby stroller further comprises a common central joint element supporting the bearing tube, the support tube, and the handlebar. The bearing tube, the support tube, and the handlebar thereby extend in a vertical plane. The bearing tube is preferably rigidly connected to the central joint element. The bearing tube is thereby supported in a hollow chamber formed in the central joint element, and the support tube and the handlebar are pivotally connected to the central joint element. The central joint element may be formed with a locking notch, and the baby stroller thereby comprises a locking element adapted to lock in the locking notch of the central joint element. The locking element is guided longitudinally movably on the handlebar. There may further be provided a bolt guiding the locking element, the handlebar having an oblong slot formed therein for guiding the bolt.

In accordance with again an added feature of the invention, the baby stroller further comprises a handlebar unlocking device disposed at the handlebar, the bolt of the locking element being connected to the handlebar unlocking device and being guided thereby in concealed fashion. The handlebar unlocking device can be manually operated. At least one tension spring is provided on each side of the handlebar unlocking device. The handlebar unlocking device is preferably a handle guided in an upper region outside the handlebar.

In accordance with again an additional feature of the invention, the baby stroller further comprises an unlocking sleeve guided longitudinally movably on the handlebar, the unlocking sleeve being disposed in a region where the handlebar unlocking device emerges from the handlebar.

Furthermore, a bolt is attached at the unlocking sleeve, the unlocking sleeve being guided by the bolt in an oblong slot formed in the handlebar. The locking element and the unlocking sleeve each perform a longitudinal motion, each of the longitudinal motions of the locking element and of the unlocking sleeve on the handlebar being at least of equal magnitude.

In accordance with again a further feature of the invention, the central joint element has a support dome, embodied as a bearing face, in an elongated direction of the bearing tube. There is also provided a locking element adapted to receive the support dome, and the support dome, in a functional position of the baby stroller, is covered by the locking element. In the preferred embodiment, a free face end of the support dome is located outside the outer boundary of the base frame in a collapsed state of the baby stroller.

In accordance with yet an added feeature of the invention, the base frame is formed with two rear wheels, and the baby stroller, in the collapsed state thereof and stood on its side, being supported stably on the two rear wheels and the two support domes of the central joint elements.

In accordance with yet an additional feature of the invention, the baby stroller further comprises a collapsible box supported in space formed between an upper edge of the base frame and a lower edge of the seat. Boxes of this type are commercially available and may be of a standard size.

In accordance with yet another feature of the invention, the chest bar is disposed removably and/or adjustably.

In accordance with yet a further feature of the invention, the baby stroller further comprises fast-action locks removably locking the wheels at the base frame. In the preferred embodiment, the stroller further comprises a bottom shelf formed between the base frame and the seat, and wherein the bottom shelf and/or the base frame is formed with receptacles for the wheels.

In accordance with a further feature of the invention, the safety lock, the locking hook, the central joint element and the handlebar unlocking device are formed of man-made material. The safety lock, the locking hook, the central joint element, and the handlebar unlocking device are preferably injection-molded components.

In accordance with a concomitant feature of the invention, the baby stroller further comprises a kick plate protecting the locking bar and a rear region of the bearing elements. The kick plate has an exterior which is preferably formed with profiling.

By embodying the carriage or stroller according to the invention, it can be collapsed into a transporting or storage position and returned to the functional position extremely quickly and simply, even by using only one hand.

Other features which are considered as characteristic for the invention are set forth in the appended claims.

Although the invention is illustrated and described herein as embodied in a collapsible baby carriage and/or stroller, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

BRIEF DESCRIPTION OF THE DRAWINGS

FIG. 1' is a view similar to FIG. 1, but showing the support on the left;

FIG. 2' is a view similar to FIG. 2, but showing the support on the left;

FIG. 3' is an enlarged view of the detail A of FIG. 3;

FIG. 4 is a schematic side view of a collapsed stroller;

FIG. 4' is a view similar to FIG. 4, but showing the support at the left;

FIG. 5 is a similar view, but in the set-up state;

DESCRIPTION OF THE PREFERRED EMBODIMENTS

Figure 1:
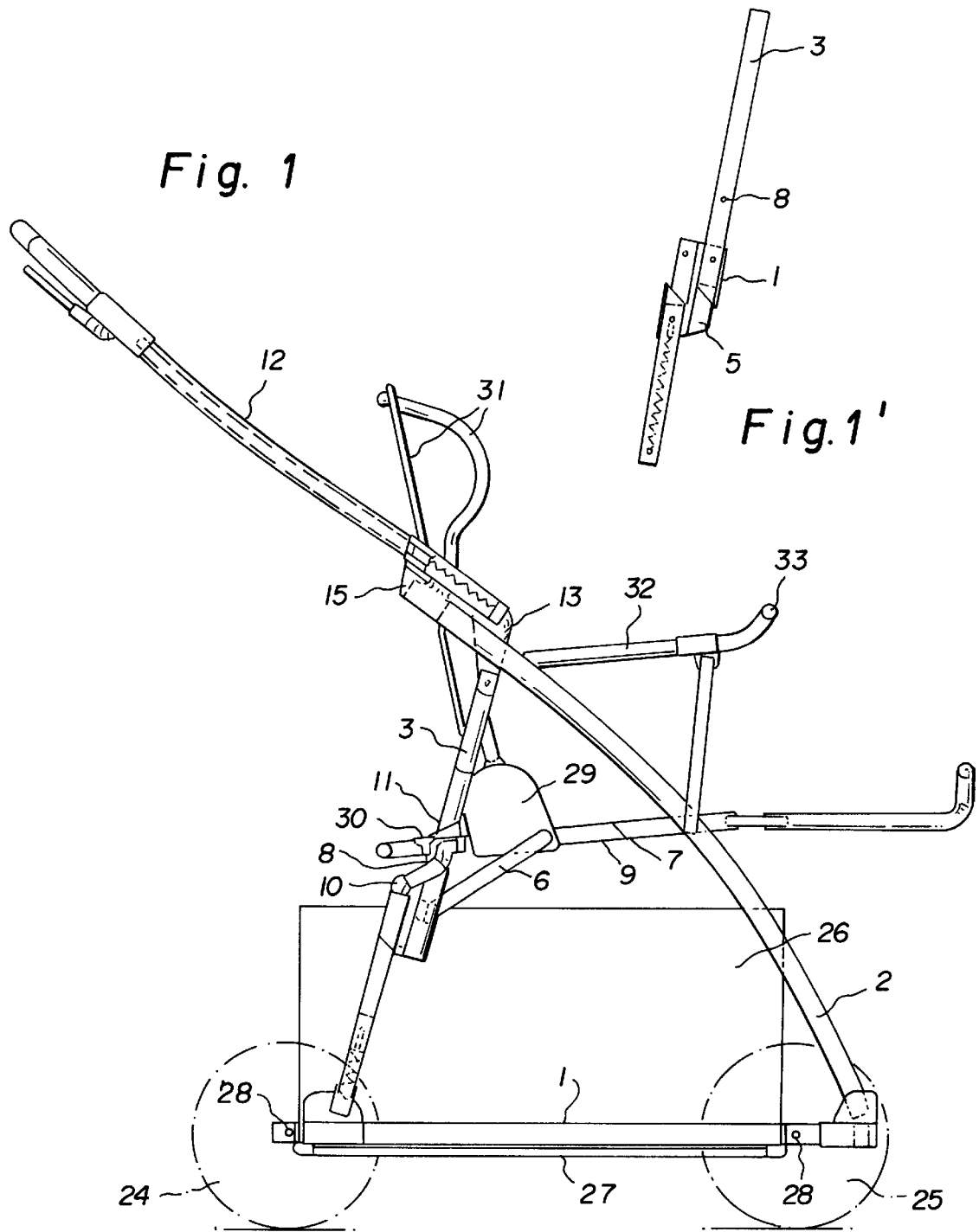
FIG. 1 is a side view, partly in section, of a stroller in the functional position.
Figure 2:
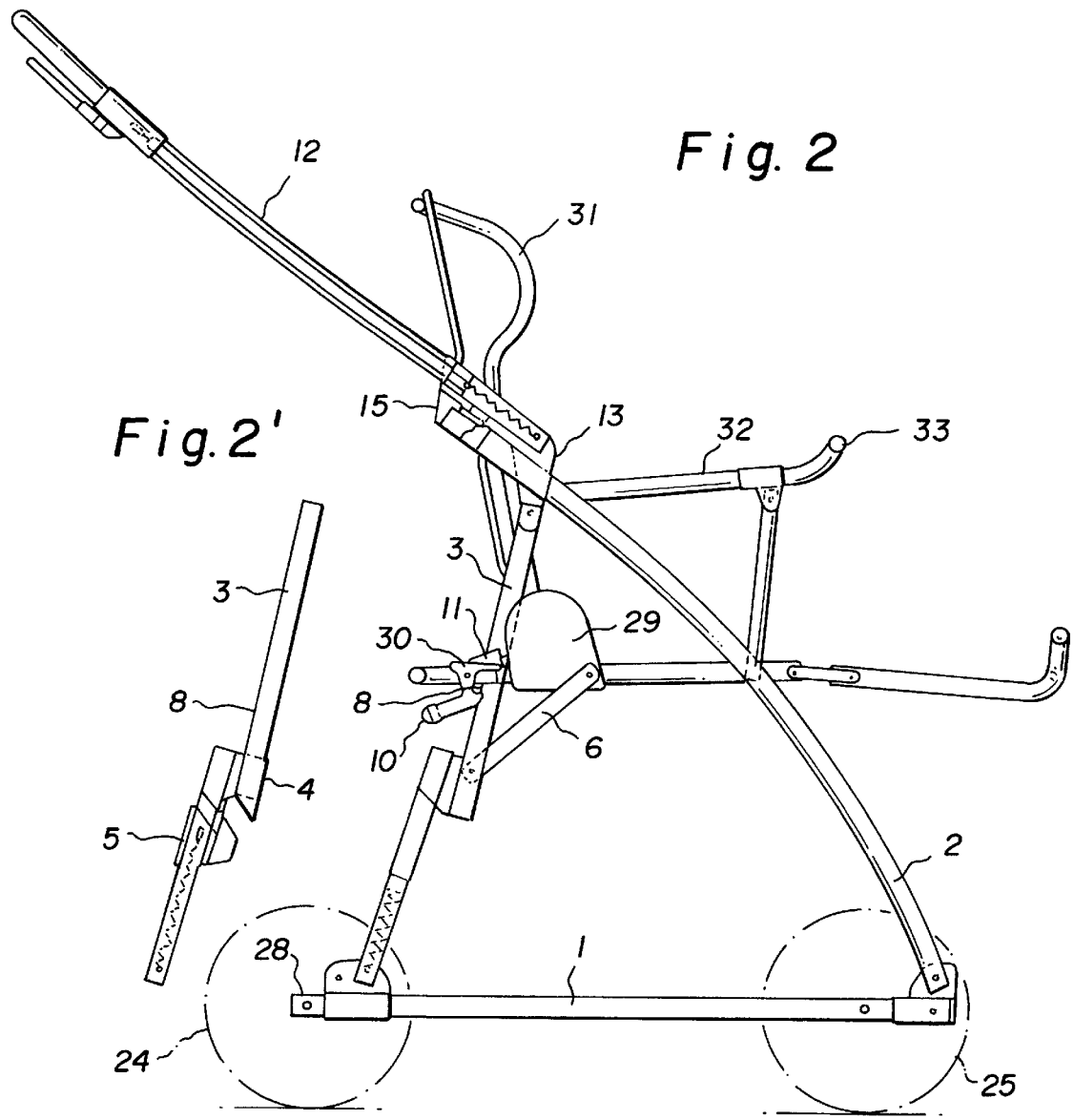
FIG. 2 is a similar view, but with the locking hook unlatched and the safety lock released.
Figure 3:
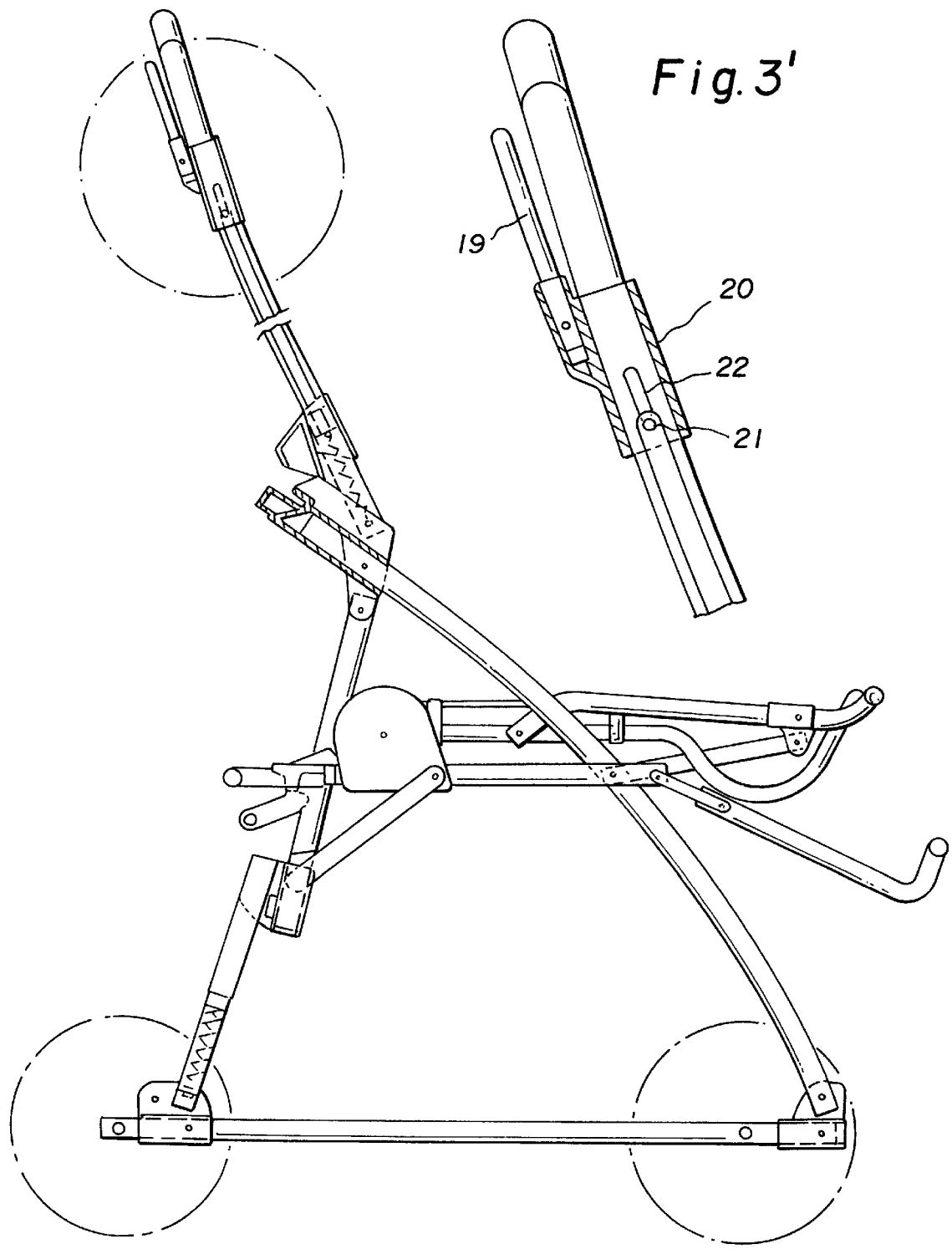
FIG. 3 is a similar view, but with the handlebar angled upward.
Figure 6:
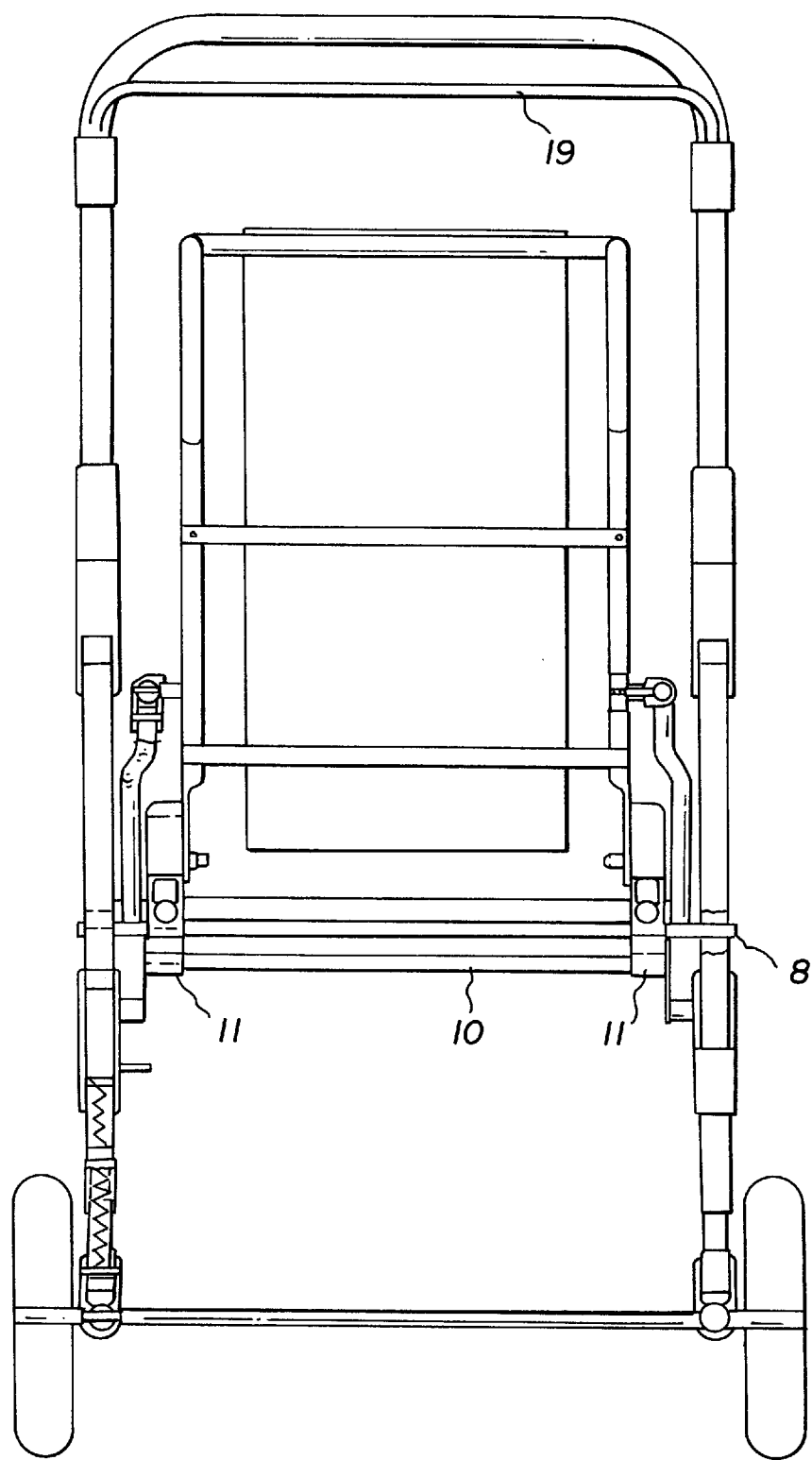
FIG. 6 is a rear elevational view as seen in the direction A of FIG. 1.
Figure 7:
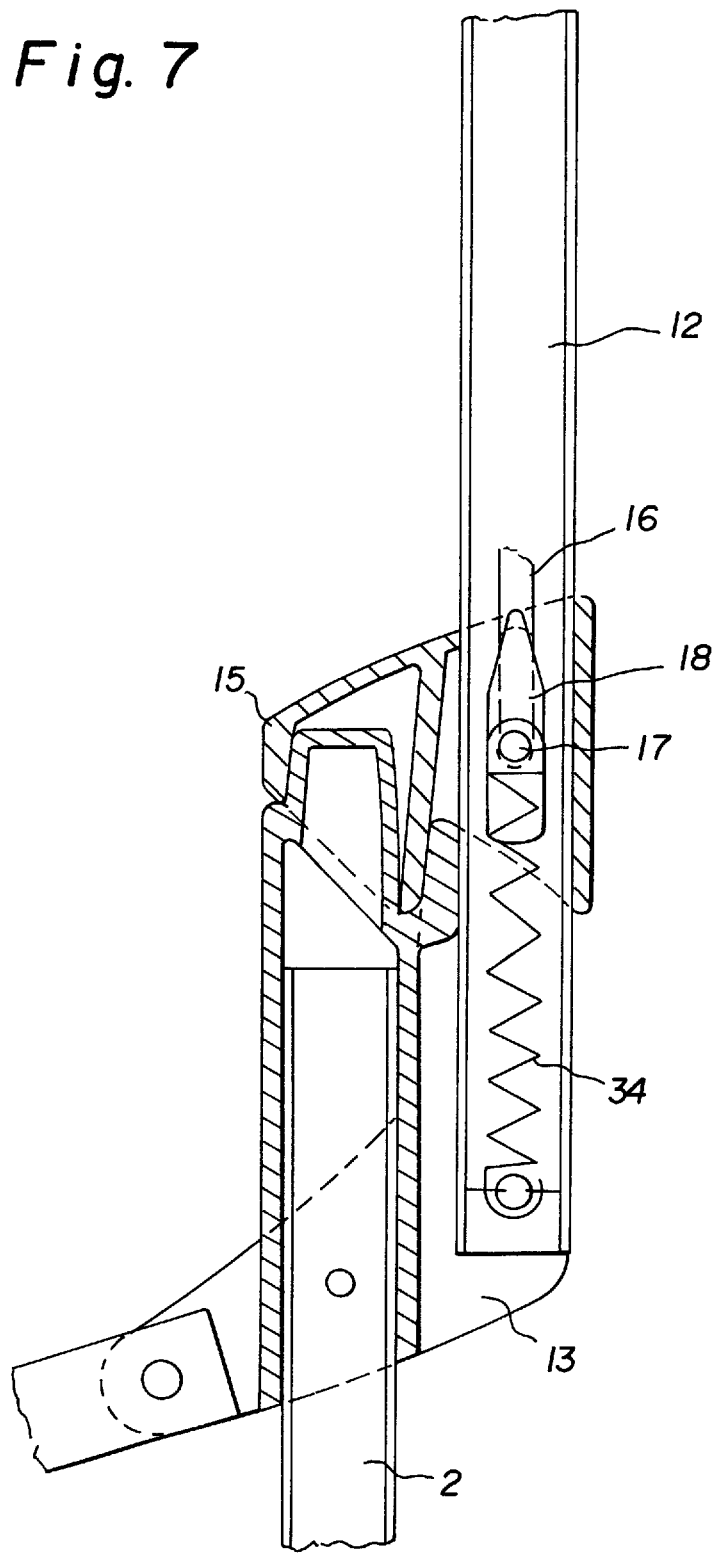
FIG. 7 is a vertical section through a central joint element in the functional position of the stroller.
Figure 8:
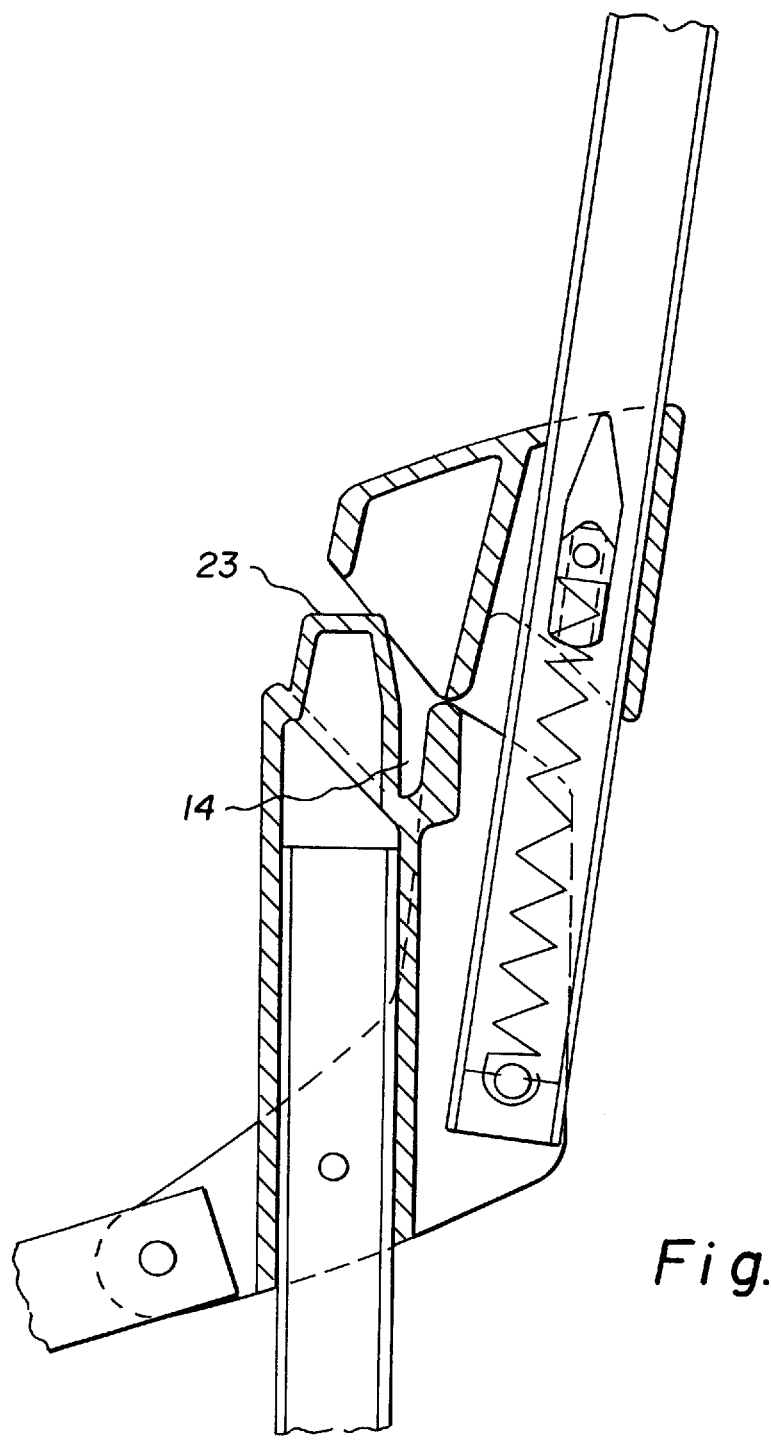
FIG. 8 is a similar view, but with a slightly tipped handlebar.
Figure 9:
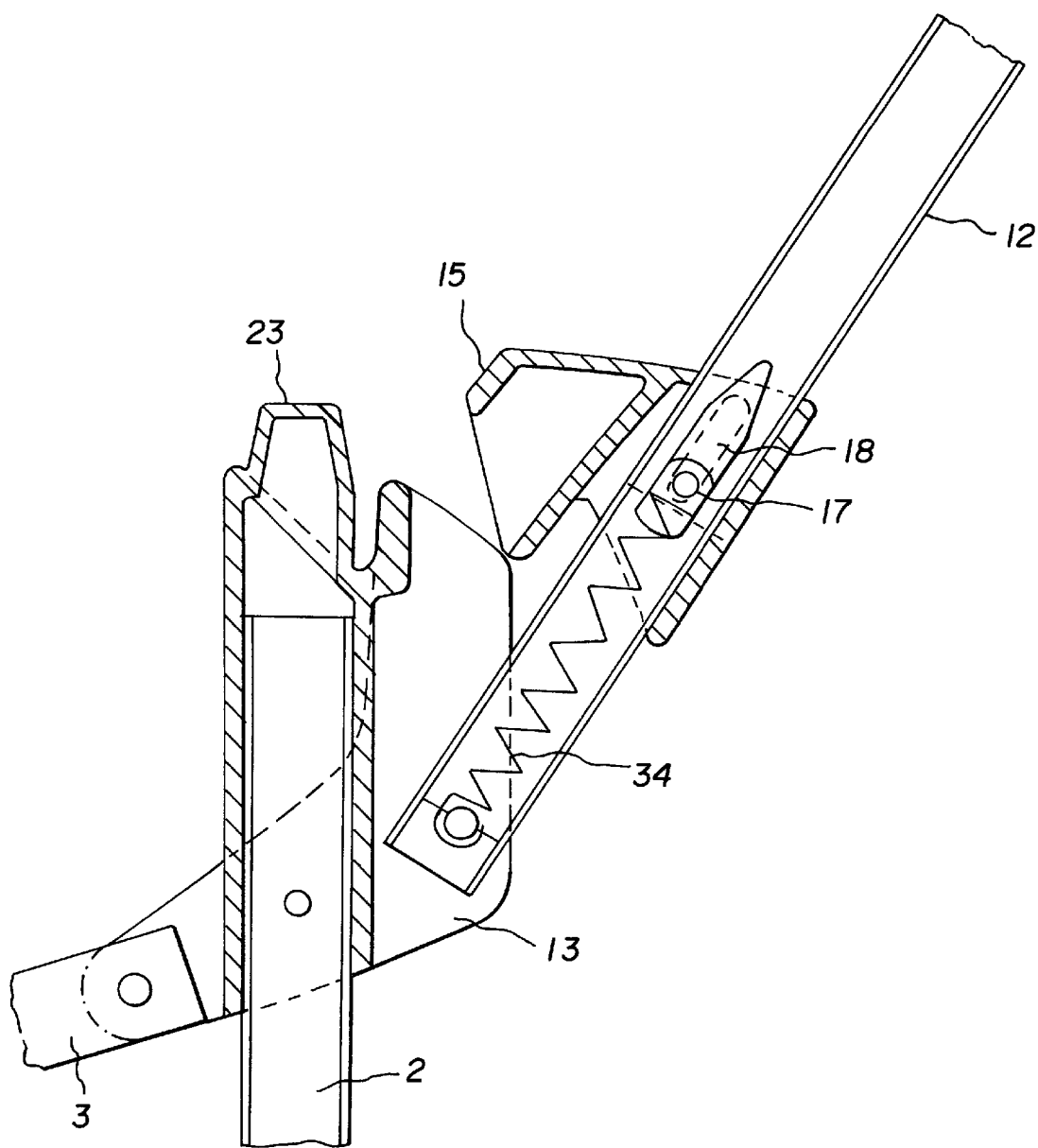
FIG. 9 is a similar view, but with the handlebar tipped more sharply.
Figure 10:
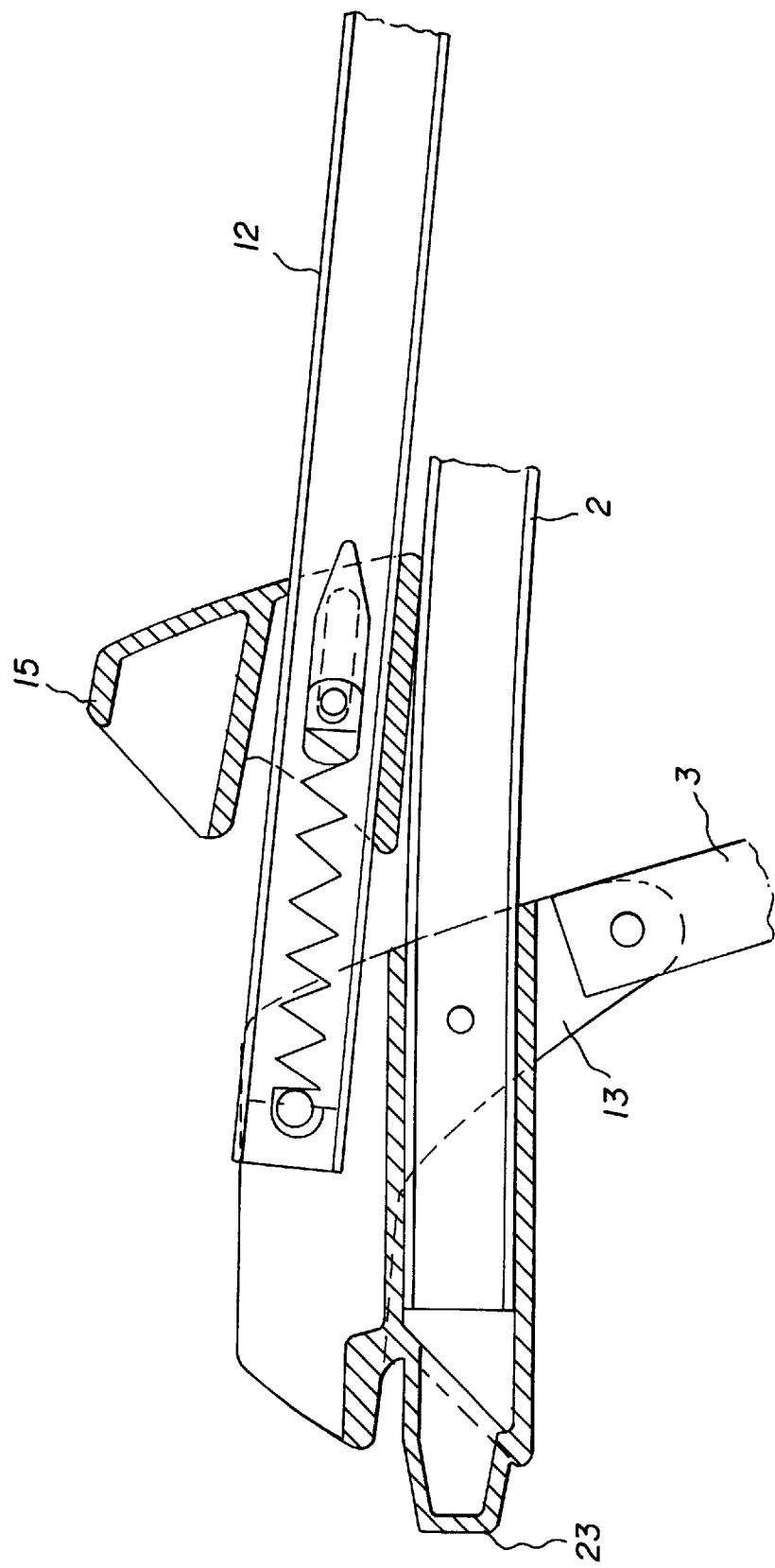
FIG. 10 is a similar view, but with the handlebar in the folded-over position.

Referring now to the figures of the drawing in detail there is seen a base frame 1, supported on axles 28. The base frame 1 is not collapsed but instead, by the disposition of a plurality of joints according to the invention, serves to support the collapsed carriage or stroller. As a result, the axles 28 and thus the wheelbase (i.e. the distance between the wheels 24; 25), remains unchanged when the stroller is collapsed. In the collapsed state, the individual parts do not protrude substantially beyond the boundary of the base frame 1.

Referring now more particularly to FIG. 1, the front bearing tubes 2 and the rear support tubes 3 are connected pivotally to the base frame 1. The rear support tubes 3 are embodied in divided form, i.e. they are formed with two parts which are articulated about one another with a folding hinge 4. A mechanically actuatable safety lock 5 is associated with the folding hinge 4. A shift lever 6 is pivotally connected to the upper region of the folding hinge 4, and its other end is connected to the bearing elements 9 of the seat member 7.

The support tubes 3 are rigidly joined together above the folding hinge 4 by a cross bar 8. The bearing elements 7 that serve to receive the seat member 7 are embodied by a U-shaped frame whose crosspiece extends below the central joint element 13 and thus below the handlebar 12. A locking bar 10 is associated with the rear region of the bearing elements 9 for the seat part 7. An upward-leading locking hook 11 is assigned to each of the outer ends of this locking bar 10; these hooks are pivotally connected to the bearing elements 9 for the seat part 7 and are embodied for locking on the cross bar 8. Each locking hook 11 is assigned a compression spring.

The bearing tube 2, the support tube 3 and the handlebar 12 are supported and connected in a common central joint element 13 and extend in a vertical plane. The bearing tube 2 rests in a hollow chamber of the central joint element 13 and is rigidly connected, while the support tube 3 and the handlebar 12 are pivotally connected. The central joint element 13 has a locking notch 14, with which a locking element 15 is associated that is guided longitudinally movably on the handlebar 12. To that end, the locking element 15 is guided via a bolt 17 in an oblong slot 18 of the handlebar 12. The bolt 17 of the locking element 15 is connected to a handlebar unlocking device 16 guided in concealed fashion, which can be operated manually and is assigned at least one tension spring 34 on each side. In the upper region, the handlebar unlocking device 16 is extended to outside the handlebar 12 and is embodied as a handle 19; one longitudinally movably guided unlocking sleeve 20 each is disposed on the handlebar 12 and is guided via a bolt 21 in an oblong slot 22 of the handlebar 12. It is important that the longitudinal motions of the locking element 15 and of the unlocking sleeve 20 on the handlebar 12 are of the same magnitude.

In the elongated direction of the bearing tube 2, the central joint element 13 has a support dome 23, embodied as a bearing face, which in the functional position of the stroller is covered by the locking element 15. The free face end of the support dome 23, after the carriage or stroller is collapsed, is located outside the base frame 1, and the collapsed carriage or stroller is supported stably on the two rear wheels 24 and the two support domes 23.

Because of the embodiment according to the invention, the space between the base frame 1 and the underside of the seat part 7 is large enough that a commercially available collapsing box 26 can be stored there. The front wheels 25 and the rear wheels 24 are easily mounted and removed via a fast-action lock. The loose wheels 24; 25 can be supported in the bottom shelf 27 or in the base frame 1 in receptacles provided there for them, and as a result the outer dimensions of the collapsed carriage or stroller can be reduced still further.

The safety lock 5, the locking hook 11, the central joint element 13 and the handlebar unlocking device 16 are made of man-made materials and can be made by injection molding. The locking bar 10 and the rear region of the bearing element 9 are provided with a profiled kick plate. The back rest 31 and the arm rests 32 with the chest bar 33 can be collapsed in a known manner by means of a sliding block 29.

I claim:

1. A collapsible baby stroller, comprising:

a base frame;

front bearing tubes pivotally connected to said base frame;

rear support tubes each being embodied in divided form and including at least two support tube parts and each being pivotally connected to said base frame;

a folding hinge pivotally joining together said at least two support tube parts of said rear support tubes;

a mechanically actuatable safety lock associated with said folding hinge;

a common central joint element supporting said front bearing tubes and said rear support tubes;

a handlebar also connected to said common central joint element;

a seat connected to said rear support tubes and said front bearing tubes;

armrests connected to said seat;

a chest bar connected to said armrests; and said folding hinge and said common central joint element allowing the baby stroller to be collapsed above said base frame.

2. The baby stroller according to claim 1, wherein said base frame has an outer boundary as seen in a plan view, and said handlebar, said armrests, said seat, and said chest bar do not protrude substantially past said outer boundary of said base frame in a collapsed state of the baby stroller.

3. The baby stroller according to claim 1, which further comprises a collapsible box supported in a space formed between an upper edge of said base frame and a lower edge of said seat.

4. The baby stroller according to claim 1, wherein said chest bar is disposed at least one of removably and adjustably.

5. The baby stroller according to claim 1, which further comprises fast-action locks removably locking said wheels at said base frame.

6. The baby stroller according to claim 5, which further comprises a bottom shelf formed between said base frame and said seat, and wherein at least one of said bottom shelf and said base frame is formed with receptacles for said wheels.

7. The baby stroller according to claim 1, which further comprises a shift lever having a first end pivotally connected at an upper region of said folding hinge.

8. The baby stroller according to claim 7, wherein said shift lever has a second end opposite said first end, said seat has bearing elements and said second end of said shift lever being one of directly and indirectly pivotally connected to said bearing elements of said seat.

9. The baby stroller according to claim 1, which further comprises a cross bar attached to and rigidly joining said rear support tubes above said folding hinge.

10. A collapsible baby stroller, comprising:

a base frame, a handlebar connected to said base frame and armrests attached to said handlebar, a seat supported on said base frame, and a chest bar associated with said seat;

bearing elements in the form of a frame receiving said seat;

a locking bar associated with a rear region of said bearing elements; and a plurality of joints for collapsing the baby stroller above said base frame.

11. The baby stroller according to claim 10, which further comprises a kick plate protecting said locking bar and said rear region of said bearing elements.

12. The baby stroller according to claim 10, wherein said locking bar has outer ends, and including an upwardly-extending locking hook connected to each of said outer ends of said locking bar.

13. The baby stroller according to claim 12, wherein said locking hooks are pivotally connected to said bearing elements for said seat.

14. The baby stroller according to claim 12, including a cross bar attached to and rigidly joining said rear support tubes and said locking hooks are embodied on said cross bar.

15. The baby stroller according to claims 12, which further comprises a compression spring associated with each of said locking hooks.

16. A collapsible baby stroller, comprising:

a base frame;

front bearing tubes pivotally connected to said base frame;

rear support tubes each being embodied in divided form and including at least two support tube parts and each being pivotally connected to said base frame;

a folding hinge pivotally joining together said at least two support tube parts of said rear support tubes;

a common central joint element supporting said front bearing tubes and said rear support tubes;

a handlebar also connected to said common central joint element;

a seat connected to said rear support tubes and said front bearing tubes;

armrests connected to said seat;

a chest bar connected to said armrests; and said folding hinge and said common central joint element allowing the baby stroller to be collapsed above said base frame.

17. The baby stroller according to claim 16, wherein said front bearing tubes, said rear support tubes, and said handlebar extend in a vertical plane.

18. The baby stroller according to claim 16, wherein said front bearing tubes are rigidly connected to said central joint element.

19. The baby stroller according to claim 18, wherein said front bearing tubes are supported in a hollow chamber formed in said central joint element.

20. The baby stroller according to claim 16, wherein said rear support tubes and said handlebar are pivotally connected to said central joint element.

21. The baby stroller according to claim 16, wherein said central joint element is formed with a locking notch.

22. The baby stroller according to claim 21, which further comprises a locking element adapted to lock in said locking notch of said central joint element.

23. The baby stroller according to claim 22, wherein said locking element is guided longitudinally movably on said handlebar.

24. The baby stroller according to claim 23, which further comprises a bolt guiding said locking element, said handlebar having an oblong slot formed therein for guiding said bolt.

25. The baby stroller according to claim 24, which further comprises a handlebar unlocking device disposed at said handlebar, said bolt of said locking element being connected to said handlebar unlocking device and being guided thereby in concealed fashion.

26. The baby stroller according to claim 25, wherein said handlebar unlocking device can be manually operated.

27. The baby stroller according to claim 25, which further comprises at least one tension spring on each side of said handlebar unlocking device.

28. The baby stroller according to claim 25, wherein said handlebar unlocking device is a handle guided in an upper region outside said handlebar.

29. The baby stroller according to claim 28, which further comprises an unlocking sleeve guided longitudinally movably on said handlebar, said unlocking sleeve being disposed in a region where said handlebar unlocking device emerges from said handlebar.

30. The baby stroller according to claim 29, which further comprises a bolt attached at said unlocking sleeve, said unlocking sleeve being guided by said bolt in an oblong slot formed in said handlebar.

31. The baby stroller according to claim 29, wherein said locking element and said unlocking sleeve each perform a longitudinal motion, each of said longitudinal motions of said locking element and of said unlocking sleeve on said handlebar being at least of equal magnitude.

32. The baby stroller according to claim 16, wherein said central joint element has a support dome, embodied as a bearing face, in an elongated direction of said bearing tube.

33. The baby stroller according to claim 32, which further comprises a locking element adapted to receive said support dome, said support dome, in a functional position of the baby stroller, being covered by said locking element.

34. The baby stroller according to claim 32, wherein said base frame has an outer boundary as seen in a plan view, and a free face end of said support dome being located outside said outer boundary of said base frame in a collapsed state of the baby stroller.

35. The baby stroller according to claim 34, wherein said base frame is formed with two rear wheels, and the baby stroller, in the collapsed state thereof, being supported stably on said two rear wheels and said two support domes of said central joint elements.

36. The baby stroller according to claims 16, which further comprises a mechanically actuatable safety lock associated with said folding hinge, two upwardly-extending locking hooks respectively connected to each of said outer ends of said locking bar, and a handlebar unlocking device disposed at said handlebar, and wherein said safety lock, said locking hook, said central joint element and said handlebar unlocking device are formed of man-made material.

37. The baby stroller according to claim 36, wherein said safety lock, said locking hook, said central joint element, and said handlebar unlocking device are injection molded components.

38. The baby stroller according to claim 11, wherein said kick plate has an exterior formed with profiling.

* * * * *